US011023609B2

(12) United States Patent
Nagai

(10) Patent No.: US 11,023,609 B2
(45) Date of Patent: Jun. 1, 2021

(54) FAULT PREVENTION SHELL FOR PREVENTING SYSTEM DISRUPTION

(71) Applicant: International Business Machines Corporation, Armonk, NY (US)

(72) Inventor: Shingo Nagai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/199,674

(22) Filed: Nov. 26, 2018

(65) Prior Publication Data

US 2020/0167493 A1 May 28, 2020

(51) Int. Cl.
*G06F 21/62* (2013.01)
*G06F 21/53* (2013.01)
*G06F 9/54* (2006.01)
*G06F 3/06* (2006.01)

(52) U.S. Cl.
CPC .......... *G06F 21/6218* (2013.01); *G06F 3/065* (2013.01); *G06F 3/0619* (2013.01); *G06F 3/0671* (2013.01); *G06F 9/546* (2013.01); *G06F 21/53* (2013.01)

(58) Field of Classification Search
None
See application file for complete search history.

(56) References Cited

U.S. PATENT DOCUMENTS

| 7,313,726 | B2 | 12/2007 | Shen | |
|---|---|---|---|---|
| 10,140,665 | B1* | 11/2018 | Lipstein | G06Q 40/12 |
| 2002/0095557 | A1* | 7/2002 | Constable | G06F 3/0637 |
| | | | | 711/163 |
| 2003/0046260 | A1* | 3/2003 | Satyanarayanan | G06F 16/148 |
| 2003/0056027 | A1* | 3/2003 | Deao | G06F 11/2236 |
| | | | | 719/318 |
| 2003/0105758 | A1* | 6/2003 | Kliewe | G06F 16/23 |
| 2004/0230794 | A1* | 11/2004 | England | G06F 9/45537 |
| | | | | 713/164 |
| 2005/0066306 | A1* | 3/2005 | Diab | G06F 8/24 |
| | | | | 717/108 |
| 2005/0240565 | A1* | 10/2005 | Kapitanski | G06F 16/258 |
| 2007/0168713 | A1 | 7/2007 | Kern | |

(Continued)

OTHER PUBLICATIONS

"Rear/01-Introduction", GitHub, posted by gozora, Jan. 26, 2017, 5 pages, <https://github.com/rear/rear/blob/master/doc/user-guide/01-introduction.adoc>.

(Continued)

*Primary Examiner* — William J. Goodchild
(74) *Attorney, Agent, or Firm* — Robert J. Shatto

(57) ABSTRACT

A computer initiates a fault prevention shell. The computer protects a plurality of the computer's files in a first storage area. The computer carries out a command entered by a user into the fault prevention shell, wherein the command targets one or more of the plurality of the computer's files in the first storage area, and wherein the command is carried out on a copy of the one or more of the plurality of the computer's files in a second storage area. The computer prompts a commit by the user to perform the command on the one or more of the plurality of the computer's files in the first storage area. The computer processes a user response to the prompt. The computer updates one or more command lists with the command.

20 Claims, 3 Drawing Sheets

(56) References Cited

U.S. PATENT DOCUMENTS

| | | | |
|---|---|---|---|
| 2007/0180206 A1 | 8/2007 | Craft | |
| 2011/0078108 A1* | 3/2011 | Kumar | G06F 16/2471 |
| | | | 707/602 |
| 2011/0219447 A1* | 9/2011 | Horovitz | G06F 9/45533 |
| | | | 726/22 |
| 2016/0212148 A1* | 7/2016 | Uzun | G06F 21/6218 |
| 2017/0322826 A1* | 11/2017 | Furuhashi | G06F 11/3433 |

OTHER PUBLICATIONS

"Relax-and-Recover project", last printed Aug. 16, 2018, 3 pages, <http://relax-and-recover.org/about/>.

"Relax-and-Recover", Linux Disaster Recovery, last printed Sep. 19, 2018, 1 page, <http://relax-and-recover.org/>.

"Safe 'rm' command", From ScorecWiki, last modified Aug. 18, 2010 by Eric Weissenstein, 1 page, <https://wiki.scorec.rpi.edu/wiki/Safe_'rm'_command>.

* cited by examiner

FAULT PREVENTION SHELL FOR PREVENTING SYSTEM DISRUPTION

BACKGROUND

In computer system maintenance and operation, there can exist situations where system administrators have access to commands which can pose a potential risk of causing system disruption by execution of the wrong command. This can occur through a trivial operation error, which may be the result of a typo or incorrectly used command, and which can lead to a critical system failure. Current procedures to address this issue do not do enough to address operation errors or otherwise have flaws.

SUMMARY

Disclosed herein are embodiments of a method, system, and computer program product for preventing system failure. A computer initiates a fault prevention shell. The computer protects a plurality of the computer's files in a first storage area. The computer carries out a command entered by a user into the fault prevention shell, wherein the command targets one or more of the plurality of the computer's files in the first storage area, and wherein the command is carried out on a copy of the one or more of the plurality of the computer's files in a second storage area. The computer prompts a commit by the user to perform the command on the one or more of the plurality of the computer's files in the first storage area. The computer processes a user response to the prompt. The computer updates one or more command lists with the command.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
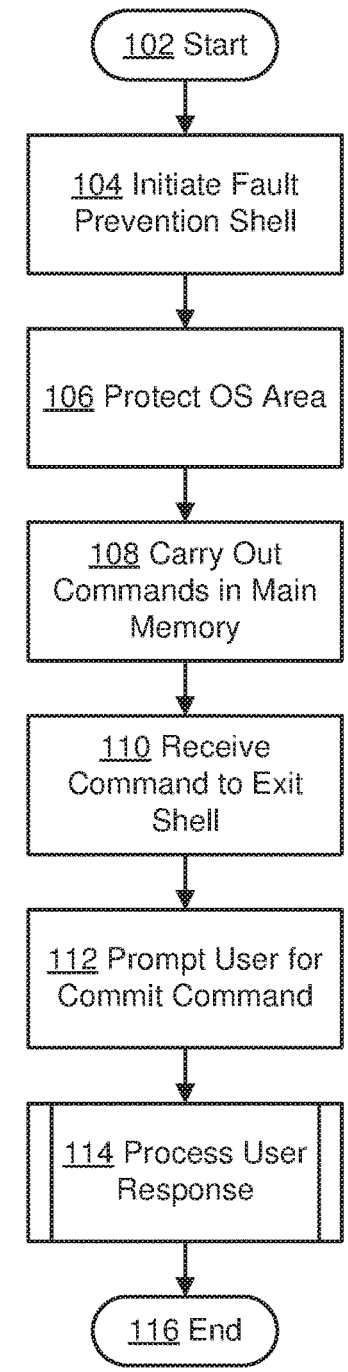
FIG. 1 depicts an example method for preventing system disruption using a fault prevention shell, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to preventing system disruption, and more specifically, to preventing system disruption using a fault prevention shell. While the present disclosure is not necessarily limited to such applications, various aspects of the disclosure can be appreciated through a discussion of various examples using this context.

Simple solutions for preventing system disruption by execution of the wrong command exist, such as reviewing operation procedure and double-checking an operation, but these solutions cannot prevent the occurrence of operation errors completely and can require significant expenditure of time and/or resources. Another alternative solution, where disruptive commands are given an alias, such that when run they require a confirmation, can reduce operation errors, but it is not feasible to replace all disruptive commands beforehand. Other solutions include system backups and restoration after system disruption. However, system backups and restoration impose additional costs for recovery because system backups need to be created frequently in order to avoid losing too much data and restoration from the backup takes time which can interrupt the use of the system and lead to additional costs. Additionally, unless the system disruption occurs immediately after the backup, some data loss is inevitable in a backup and restore system.

An improved solution for preventing system disruption by execution of the wrong command leading to operation errors can yield benefits in terms of both cost reduction and prevention of damage to computing systems and/or data contained within the computing systems.

Embodiments of the present disclosure provide for a fault prevention shell to aid in the prevention of system disruption. The fault prevention shell can be a user interface for access to a computer's operating system's services. When the fault prevention shell is initiated, the computer can protect the operating system files and carry out any commands input into or operations performed in the shell in a temporary area in the main memory where these commands cannot disrupt the system. Upon receiving a command to exit the fault prevention shell, the computer can prompt the user for a "commit" command which will signify the user's confirmation that the commands entered into the fault prevention shell and any alterations to the operating system's files or data will be performed. The computer can process the user's response to the prompt according to whether the commit is received or not. If a commit is received, the computer can check a list of previously-user-rejected commands (not committed to or otherwise not performed) and determine if any commands input into the fault prevention shell match the entries on the list of previously-user-rejected commands. If there is a match, the computer can request confirmation that the user wishes to perform these commands in light of the list of previously-user-rejected commands. If they are confirmed or if there were no matches, the computer can synchronize the protected operating system files with the commands entered into the fault prevention shell and operations performed therein. Commands so synchronized can be added to a safe list of commands for future iterations of the procedure. Commands not synchronized can be stored in a list of potentially dangerous commands, and if they are not also on the safe list, placed on a list of previously-user-rejected commands.

The nature of the list of safe commands, list of potentially dangerous commands, and list of previously-user-rejected commands can each vary in embodiments. In some embodiments, a list of safe commands can be those commands which have been previously committed to by a user. These commands can be such that a user has never decided not to execute them, which leads to increased likelihood that they are not harmful commands over successive iterations of the procedure. In some embodiments, a list of potentially dangerous commands can be commands which have been discarded due to lack of commitment by a user. These commands can be such that a user has decided during the processing of a user's response, not to execute these commands on the protected operating system, which can indicate they would have had harmful effects if executed. In some embodiments, a list of previously-user-rejected commands can be a list of commands which are on the list of potentially dangerous commands and do not also appear on the list of safe commands. These commands are commands that a user has thus never executed through the fault prevention shell despite entering in main memory and may have been discarded during the processing of a user's response to protect the computer.

In these embodiments, committed execution of a command once will result in it appearing on the list of safe commands and prevent it from appearing on the list of previously-user-rejected commands, which could result in a small list of previously-user-rejected commands. This will lower the frequency of a user being requested to confirm performance of commands (despite their appearance on the list of previously-user-rejected commands), which may be desirable for simplicity, but may allow for commands which are often, although not always, rejected from being further considered by the user.

In other embodiments, more complicated systems of list(s) can be used. For example, instead of a binary option of a command either appearing on a list or not, one or more of the lists can include a count of how many times the command has been executed or has been discarded. In such embodiments, a command which has been repeatedly executed and stored on the list of safe commands may have a high number associated with it, and a command which has repeatedly not been executed may have a high number (or highly negative number) associated with it. In such embodiments, a list of previously-user-rejected commands can include those commands which have been executed less often than not (e.g., have a lower number on the safe list than on the dangerous list or have a negative total number). In some embodiments, a threshold value may be used for determining whether a command is on the list of previously-user-rejected commands or not (e.g., if the command's number on the safe list is less than half its number on the potentially dangerous list or if the command has been synchronized to the protected operating system less than 66% of the total times it was entered in main memory, it can be placed on the list of previously-user-rejected commands).

Embodiments using a count system such as this can provide greater security in adding commands which are rejected more often than not (or more often than a threshold level) to the list of previously-user-rejected commands. This can increase the amount of user review of proposed commands, which can lead to greater protection from potentially dangerous commands, at the cost of simplicity and user time.

In other embodiments, rather than separate lists, a combined list, spreadsheet, set of key-value pairs, or other representation of the above data, can be maintained with one or more associated values for each command. For example, a spreadsheet can be maintained with each row corresponding to a command and numbers and/or percentages of times executed and times rejected for each command can appear in corresponding columns. The format of the data used in this disclosure is not meant to be limiting.

Use of such a fault prevention shell and confirmation of potentially dangerous commands as described can lead to a low-cost process for protecting a computer from system disruption. This does not require potentially time-consuming computer backups and restores, nor does it require entry of prohibited or potentially dangerous commands ahead of time, although adding such commands to lists as used in this disclosure is possible. These improvements and/or advantages are a non-exhaustive list of example advantages. Embodiments of the present disclosure exist which can contain none, some, or all of the aforementioned advantages and/or improvements.

Referring now to FIG. 1, depicted is an example method 100 for preventing system disruption using a fault prevention shell, in accordance with embodiments of the present disclosure. Method 100 can include more or fewer operations than those depicted. In the following discussion, this disclosure will refer to method 100 being performed by a computer, but method 100 can be performed by various types of devices in various embodiments, including but not limited to a personal computer, a mainframe computer, a server, a smartphone, a personal data assistant (PDA), or a virtual machine on a computer. In some embodiments, method 100 can be performed by an administrator device (such as administrator device 300 depicted in FIG. 3). In some embodiments, a user can initiate method 100 on a first computer with remote access to a second computer. In such embodiments, all of method 100 can be performed on the second computer (e.g., the fault prevention shell may be initiated on the second computer and operations carried out in the main memory of the second computer, while the operating system of the second computer is protected).

From start 102, method 100 proceeds to 104 where the computer initiates the fault prevention shell. Method 100 can be triggered and operation 104 reached due to a user initiating the fault prevention shell. This could occur if a user with administrator privileges wishes to perform operations which could potentially lead to system disruption if entered incorrectly. For example, an administer wishing to remove directories from a Linux system using the remove command "rm-r" could initiate the fault prevention shell to protect against accidentally entering the command "rm-rf" and removing directories without a confirmation prompt.

In other embodiments, operation 104 can be reached any time a user with administrator privileges logs on to the computer. In such embodiments, additional protection can be provided where an administrator does not need to proactively initiate the fault prevention shell. In these embodiments, all commands input by an administrator into the computer will proceed through method 100's fault prevention shell, which can add additional time and keystrokes for the administrator.

In other embodiments, operation 104 can be triggered upon entry of a command by a user which would target the operating system files of a computer, or upon entry of a predetermined list of commands. This predetermined list of commands could be generated from prior instances of method 100 and could be the list of potentially dangerous commands or the list of previously-user-rejected commands discussed above in more detail.

The fault prevention shell can take the form of a user interface for access to a computer's operating system's services. Such an interface can be a command line interface, a graphical user interface, or other interface. The fault prevention shell can receive input from a user which can include commands to perform various operations on the computer. The nature of the commands recognized by the fault prevention shell will vary in embodiments depending on the nature of the computer, the operating system of the computer, and other aspects of the computer.

After the fault prevention shell is initiated 104, method 100 proceeds to 106, where the operating system is protected. The operating system area of the disk (whether hard disk drive, solid state drive, network drive, virtual drive, or any other area of storage) is placed in a read-only mode such that the files therein cannot be modified. This protects the system from operation errors while the user with administrator privileges is entering commands. In some embodiments, at 106, the computer can also create a copy of the operating system's files in main memory where they can be accessed and modified. In other embodiments, the operating system's files can be read as necessary from their original location and any modifications or new files to be added can be done in main memory as in 108 below. Any read requests for these new or modified files can target, or be redirected by the fault prevention shell to, the main memory.

At 108, the computer carries out operations according to commands input by the user with administrator privileges. This can include creating new files, modifying existing files, deleting existing files, and/or reading existing files. Any creation, modification, or deletion of files which would target the operating system (which was placed in a read-only mode in operation 106) can be done in a temporary area of the main memory. This can involve creating copies of relevant files and modifying them according to the commands entered and/or recording a list of operations to perform which will result in alterations. Such alterations can ultimately be synchronized with the operating system files later in method 100 or in sub-process 200 (discussed below regarding FIG. 2) if committed to or discarded if not committed to. In embodiments where a copy of the operating system's files was created in the main memory and modifications were made to it there, such synchronization can be copying the version of the operating system's files from main memory.

At 110, the computer receives a command from the user with administrator privileges to exit the fault prevention shell. In some embodiments, this command could instead be a command to synchronize with the operating system files the operations performed which resulted in creation of files or modification of files which would have targeted the operating system (but were placed in main memory instead), but to remain within the fault prevention shell for future operations. This could be akin to a command to 'save and continue working.' In some embodiments, the command to exit the fault prevention shell could be automatically issued after a certain period of time passed, a certain number of operations were carried out, or upon system shut down. In some embodiments, a user may customize when the automatic issuance of the command will occur.

At 112, the computer prompts the user with administrator privileges for a "commit" command. In some embodiments, this prompt can take the form of a pop-up message to the user with an option to commit the changes made or to discard the changes. In some embodiments, this could be presented to a user of a device through a monitor or other screen (which could be one of I/O devices 312 discussed below regarding FIG. 3). In some embodiments, the user may have the option to cancel the command to exit the fault prevention shell and continue working instead of committing to the changes. In some embodiments, the prompt can include a listing of the changes to which the user is being asked to commit, to refresh the memory of the user. In some embodiments, a user may be able to provide a commit command along with the command to exit the fault prevention shell, which may bypass operation 112. While the terms "commit" and "commit command" are used throughout this disclosure, the name of the command is not to be read as limiting and varying terminology can be used in various embodiments.

At 114, the computer processes the user's response to the prompt issued at 112 (or in embodiments where a user can commit without a prompt, the user's commit command). This can involve checking the commands to be executed against a list of previously-user-rejected commands or otherwise determining if the commands are approved for execution. This can also involve storing commands to be executed or commands to be discarded in one or more lists, such as one or more lists of safe commands, one or more lists of potentially dangerous commands, or one or more lists of previously-user-rejected commands. In some embodiments, lack of a user response can be processed if no user response is received. Operation 114, processing user response, is discussed in more detail regarding sub-process 200 below regarding FIG. 2. After operation 114, method 100 ends at 116.

Figure 2:
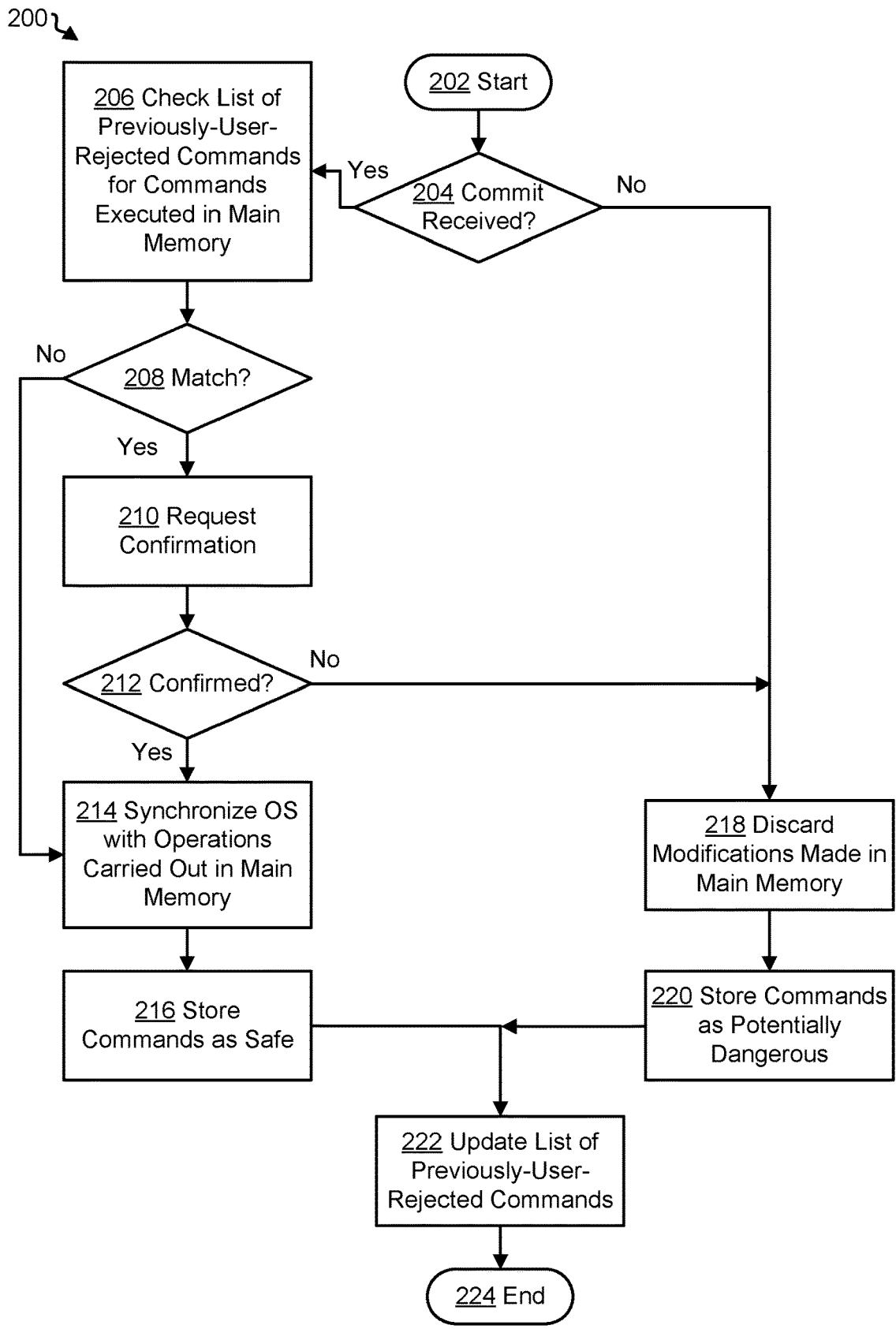
FIG. 2 depicts an example sub-process for processing a user response to a commit command in a method for preventing system disruption using a fault prevention shell, in accordance with embodiments of the present disclosure.

Referring now to FIG. 2, depicted is an example sub-process 200 for processing a user response to a commit command in a method for preventing system disruption using a fault prevention shell, in accordance with embodiments of the present disclosure. Sub-process 200 can include more or fewer operations than those depicted. Sub-process 200 can include operations in different orders than those depicted. In the following discussion, this disclosure will refer to sub-process 200 being performed by a computer, but sub-process 200 can be performed by various types of devices in various embodiments, including but not limited to a personal computer, a mainframe computer, a server, a smartphone, a personal data assistant (PDA), or a virtual machine on a computer. In some embodiments, sub-process 200 can be performed by an administrator device (such as administrator device 300 depicted in FIG. 3).

Sub-process 200 can reach start 202 from a method such as method 100, discussed above regarding FIG. 1. Sub-process 200 can be triggered after a user has been prompted for a commit command, such as at operation 112 of method 100 or upon receipt of a commit command in conjunction with a command to exit a fault prevention shell at operation 110 of method 100. Sub-process 200 can be a detailed process for processing a user response described above as operation 114 of method 100.

Once sub-process 200 has started at 202, it proceeds to 204, where the computer checks whether a commit command has been received. The computer can receive this command in response to a user prompt, such as clicking on a button in a pop-up labeled "commit." The computer can also receive this command as a result of an entry of a command to commit in a text-based user interface or by other appropriate means.

If the computer determines at 204 that it received a commit command, sub-process 200 proceeds to 206. At 206, the computer checks a list of previously-user-rejected commands, for commands which the user executed in main memory. The list of previously-user-rejected commands can take various forms in different embodiments as discussed above in more detail, and can be e.g., a list, spreadsheet, or set of key-value pairs. In some embodiments, the list of previously-user-rejected commands can be a list of commands which appear on a list of dangerous commands and do not also appear on a list of safe commands. In other embodiments, the list of previously-user-rejected commands can contain a list of commands which have been rejected by a user or otherwise not committed to by a user more often than not, or more often than a threshold value.

At 20S, the computer determines if there is a match between one or more commands which the user entered into the fault prevention shell and were executed in main memory with one or more commands on the list of previously-user-rejected commands. In checking the list of commands the user entered into the fault prevention shell with the list of previously-user-rejected commands, the computer can check for identical matches of commands or can check for commands which share similarities. For example, if a command to delete a specific directory is present on the list of previously-user-rejected commands, a command to delete a different directory can be considered a match in some embodiments, or not to be a match in other embodiments. In various embodiments, the commands on the list of previously-user-rejected commands can have varying levels of specificity such as this, to simplify a determination of a match. Similarly, a command to perform an operation may be on a list of previously-user-rejected commands when the command is performed in a particular location (e.g., file system, directory, network location), but not when performed in another location.

If the computer determines there is a match, sub-process 200 proceeds to 210. At 210, the computer requests confirmation from the user that the command(s) should be executed. This can take the form of a user prompt, which may contain a listing of the matching commands or a listing of all of the commands to be executed. In some embodiments, the request for confirmation can include a description of the matching command, which may be obtained e.g., from the help menu or may have been input by a user when previously rejecting the command, or any other relevant information about the matching command.

At 212, the computer determines if the user has confirmed execution of the matching command(s). This can include determining if a user has responded in the affirmative in some fashion to the request for confirmation (e.g., clicking confirm, yes, or other indication of assent). In some embodiments, a user may be able to select all of the commands to be executed or all of the commands not to be executed.

Sub-process 200 can reach 214 if there were no matching commands at 208 or if a user confirmed matching command (s) at 212. At 214, the computer can synchronize the protected operating system files with the commands entered into the fault prevention shell and operations performed therein. In some embodiments, this can be performed by removing the protection from the operating system and executing the commands entered into the fault prevention in the operating system's files. In some embodiments, the computer can remove the protection from the operating system and copy the files saved in the main memory to the operating system's files. In embodiments where a copy of the operating system's files was created in the main memory and operations were performed on the copy, this can be performed by removing the protection from the operating system and overwriting the operating system's files with the copy of the operating system's files (as modified by the committed commands).

At 216, the computer stores the commands as safe. This can vary in embodiments depending on the nature of the safe list as described above in more detail. In some embodiments, this can involve placing commands which have been performed on a list of safe commands. In other embodiments, this can include storing or updating a number of times a command was executed by the computer. In some embodiments, if a command is already on the safe list, it will not be added to the safe list again and only new commands will be added to the list. The list of safe commands can be used in future iterations of sub-process 200 and can be used in conjunction with a list of potentially dangerous commands to create a list of previously-user-rejected commands.

Sub-process 200 can reach 218 if no commit command was received at 204 or if a user did not confirm commands at 212 which matched entries on a list of previously-user-rejected commands. This can occur if a user fails to provide commitment/confirmation or if a user affirmatively rejects a prompt for commitment or a request for confirmation. At 218, the computer discards the modifications made in main memory which resulted from the commands input into the fault prevention shell. This can include deleting copies of files in main memory or the copy of the operating system's files in the main memory. After this, the computer can remove the protection from the operating system's files.

At 220, the computer stores the commands as potentially dangerous. This can vary in embodiments depending on the nature of the potentially dangerous list as described above in more detail. In some embodiments, this can involve placing commands which have not been executed on a list of potentially dangerous commands. In other embodiments, this can include storing or updating a number of times a command was not executed by the computer despite being entered into the fault prevention shell. In some embodiments, if a command is already on the potentially dangerous list, it will not be added to the potentially dangerous list again and only new commands will be added to the list. The list of potentially dangerous commands can be used in future iterations of sub-process 200 and can be used in conjunction with a list of safe commands to create a list of previously-user-rejected commands.

At 222, the computer updates the list of previously-user-rejected commands. This can vary in embodiments as discussed above in more detail, including with regard to operation 206. In some embodiments, the computer checks any commands on the list of previously-user-rejected commands were added to the safe list in operation 216 and removes any commands that were. In some embodiments, the computer checks the list of potentially dangerous commands for new entries, and if so, checks whether these commands are also on the safe list. In these embodiments, a command can be added to the list of previously-user-rejected commands if the command is added to the list of potentially dangerous commands and is not on the safe list. In embodiments using counts for commands on the safe and potentially dangerous command lists, updating the list of previously-user-rejected commands at 222 can include comparing the counts of commands on both lists (and in some embodiments, comparing with a threshold value) to determine whether to add or remove a command from the list of previously-user-rejected commands. The updated list of previously-user-rejected commands can be used in future iterations of sub-process 200. Each time the computer performs sub-process 200, the operation of the fault prevention shell can be improved by creating a more accurate list of previously-user-rejected commands using the commands synchronized with the operating system's files and placed on a safe list or discarded and placed on a potentially dangerous list. After 222, sub-process 200 ends at 224.

Figure 3:
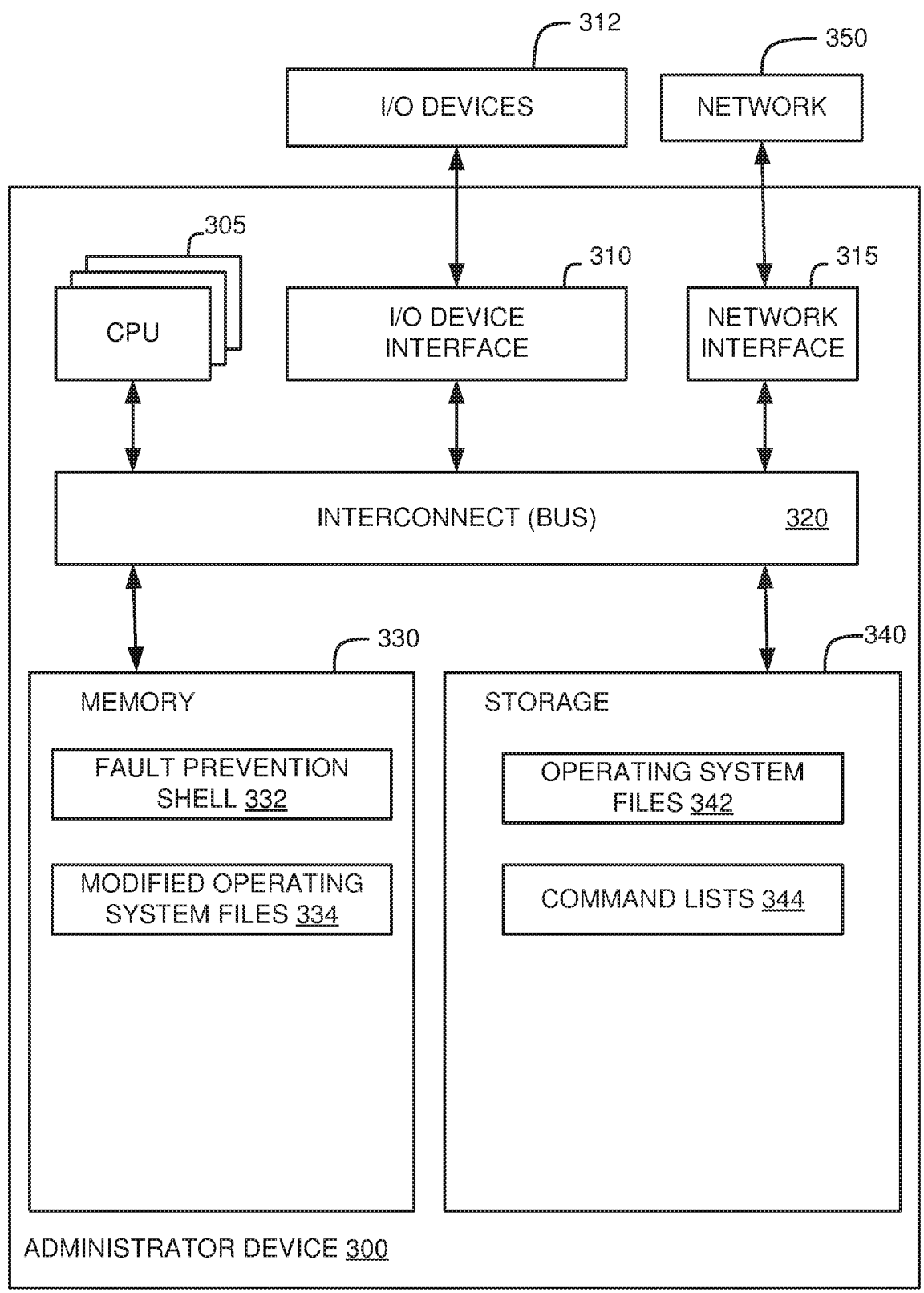
FIG. 3 illustrates a block diagram of an administrator device, in accordance with some embodiments of the present disclosure.

Referring now to FIG. 3, illustrated is a block diagram of an administrator device 300, in accordance with some embodiments of the present disclosure. In some embodiments, administrator device 300 performs operations in accordance with FIGS. 1 and/or 2 as described above. The administrator device 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340.

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash).

In some embodiments, the memory 330 can be in the form of modules (e.g., dual in-line memory modules). The storage 340 is generally included to be representative of a non-volatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the administrator device 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of administrator device 300 includes fault prevention shell 332 and modified operating system files 334. Fault prevention shell 332 is a shell for use in method 100 and sub-process 200 above where a user can input commands which would modify operating system files. The administrator device 300 can carry out commands input into fault prevention shell 332 in memory 330 and create modified operating system files 334. This can be done instead of modifying the operating system files 342 in storage 340. Depending on the commands entered into fault prevention shell 332 and user responses to prompts and/or requests in fault prevention shell 332, the commands entered can be synchronized to operating system files 342 of storage 340 or discarded.

Modified operating system files 334 can be a copy of operating system files 342 which can be modified through operation of fault prevention shell 332 and commands input into it by a user of administrator device 300. Modified operating system files 334 can also be copies of only the files created by or modified by commands input into fault prevention shell 332.

Storage 340 contains operating system files 342 and command lists 344. Operating system files 342 can be the operating system files of administrator device 300. Through method 100, these files can become protected such that they cannot be changed unless a user enters files into a fault prevention shell and confirms those commands as described in more detail above regarding FIGS. 1 and 2.

Command lists 344 can be one or more lists containing commands which are marked safe, potentially dangerous, or previously-user-rejected. The nature and amount of command lists 344 will vary in embodiments. In some embodiments, command lists 344 will comprise one safe list for commands which have been synchronized to the operating system's files, one list of potentially dangerous commands which have not been executed on the operating system's files despite entry into the fault prevention shell, and one list of previously-user-rejected commands which appear on the list of potentially dangerous commands, but not on the safe list. In other embodiments, one or more of command lists 344 will contain counts or percentages of times a command has been executed or not executed. In some embodiments, command lists 344 can take alternative forms including one or more spreadsheets or sets of key-value pairs.

In some embodiments as discussed above, the memory 330 stores fault prevention shell 332 and modified operating system files 334, and the storage 340 stores operating system files 342 and command lists 344. However, in various embodiments, each of the fault prevention shell 332, modified operating system files 334, operating system files 342, and command lists 344 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with administrator device 300.

The network 350 can connect (via a physical or wireless connection) the administrator device 300 with other networks, and/or one or more devices that interact with the user device.

Logic modules throughout the administrator device 300—including but not limited to the memory 330, the CPUs 305, and the I/O device interface 310—can communicate failures and changes to one or more components to a hypervisor or operating system (not depicted). The hypervisor or the operating system can allocate the various resources available in the administrator device 300 and track the location of data in memory 330 and of processes assigned to various CPUs 305. In embodiments that combine or rearrange elements, aspects and capabilities of the logic modules can be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for preventing system failure, the method comprising:
   initiating a fault prevention shell;
   protecting a plurality of a computer's files in a first storage area;
   carrying out a command entered by a user into the fault prevention shell, wherein the command targets one or more of the plurality of the computer's files in the first storage area, and wherein the command is carried out on a copy of the one or more of the plurality of the computer's files in a second storage area;
   prompting a commit by the user to perform the command on the one or more of the plurality of the computer's files in the first storage area;
   processing a user response to the prompt; and updating one or more lists of commands entered by one or more users into the fault prevention shell with the command.

2. The method of claim 1, wherein processing the user response to the prompt further comprises:
determining the command is present on a list of previously-user-rejected commands, wherein the list of previously-user-rejected commands is a list of commands which have been previously never committed to.

3. The method of claim 2, further comprising:
requesting confirmation from the user that the command should be carried out on the one or more of the plurality of the computer's files in the first storage area.

4. The method of claim 3, further comprising:
carrying out the command entered by the user into the fault prevention shell, and wherein the command is carried out on the one or more of the plurality of the computer's files in the first storage area.

5. The method of claim 4, wherein updating one or more command lists with the command comprises adding the command to a list of safe commands.

6. The method of claim 1, wherein processing a user response to the prompt further comprises:
discarding the copy of the one or more of the plurality of the computer's files in the second storage area.

7. The method of claim 6, wherein updating one or more command lists with the command comprises adding the command to a list of potentially dangerous commands.

8. The method of claim 1, wherein updating one or more command lists with the command further comprises:
adding the command to a list of previously-user-rejected commands if it appears on a list of potentially dangerous commands and does not also appear on a list of safe commands.

9. The method of claim 1, wherein updating one or more command lists with the command further comprises:
incrementing a count value corresponding to the command on the one or more command lists.

10. The method of claim 1, wherein initiating the fault prevention shell is triggered upon entry of the command by the user and determination that the command targets operating system files of the computer.

11. A system for preventing system failure, the system comprising:
one or more processors;
a first storage area;
a second storage area; and
a memory communicatively coupled to the one or more processors,
wherein the memory comprises instructions which, when executed by the one or more processors, cause the one or more processors to perform a method comprising
initiating a fault prevention shell, wherein the fault prevention shell is a user interface for access to a computer's operating system's services;
protecting a plurality of a computer's files in the first storage area;
carrying out a command entered by a user into the fault prevention shell, wherein the command targets one or more of the plurality of the computer's files in the first storage area, and wherein the command is carried out on a copy of the one or more of the plurality of the computer's files in the second storage area;
prompting a commit by the user to perform the command on the one or more of the plurality of the computer's files in the first storage area;
processing a user response to the prompt; and
updating one or more lists of commands entered by one or more users into the fault prevention shell with the command.

12. The system of claim 11, wherein processing the user response to the prompt further comprises:
determining the command is present on a list of previously-user-rejected commands, wherein the list of previously-user-rejected commands is a list of commands which have been previously never committed to; and
requesting confirmation from the user that the command should be carried out on the one or more of the plurality of the computer's files in the first storage area.

13. The system of claim 12, further comprising:
carrying out the command entered by the user into the fault prevention shell, and wherein the command is carried out on the one or more of the plurality of the computer's files in the first storage area.

14. The system of claim 11, wherein processing a user response to the prompt further comprises:
discarding the copy of the one or more of the plurality of the computer's files in the second storage area.

15. The system of claim 11, wherein updating one or more command lists with the command further comprises:
adding the command to a list of previously-user-rejected commands if it appears on a list of potentially dangerous commands and does not also appear on a list of safe commands.

16. A computer program product for preventing system failure; the computer program product comprising a computer readable storage medium having program instructions embodied therewith, wherein the computer readable storage medium is not a transitory signal per se, the program instructions executable by a computer to perform a method comprising:
initiating a fault prevention shell;
protecting a plurality of a computer's files in a first storage area;
carrying out a command entered by a user into the fault prevention shell, wherein the command targets one or more of the plurality of the computer's files in the first storage area, and wherein the command is carried out on a copy of the one or more of the plurality of the computer's files in a second storage area;
prompting a commit by the user to perform the command on the one or more of the plurality of the computer's files in the first storage area;
processing a user response to the prompt; and
updating one or more lists of commands entered by one or more users into the fault prevention shell with the command.

17. The computer program product of claim 16, wherein processing the user response to the prompt further comprises:
determining the command is present on a list of previously-user-rejected commands, wherein the list of previously-user-rejected commands is a list of commands which have been previously never committed to; and
requesting confirmation from the user that the command should be carried out on the one or more of the plurality of the computer's files in the first storage area.

18. The computer program product of claim 17, further comprising:
carrying out the command entered by the user into the fault prevention shell, and wherein the command is carried out on the one or more of the plurality of the computer's files in the first storage area.

19. The computer program product of claim 16, wherein processing a user response to the prompt further comprises:
   discarding the copy of the one or more of the plurality of the computer's files in the second storage area.

20. The computer program product of claim 16, wherein updating one or more command lists with the command further comprises:
   adding the command to a list of previously-user-rejected commands if it appears on a list of potentially dangerous commands and does not also appear on a list of safe commands.

\* \* \* \* \*